United States Patent Office.

CHRISTIAN RUDOLPH, OF OFFENBACH-ON-THE-MAIN, GERMANY, ASSIGNOR TO K. OEHLER, OF SAME PLACE.

COLORING-MATTER.

SPECIFICATION forming part of Letters Patent No. 395,080, dated December 25, 1888.

Application filed June 12, 1888. Serial No. 276,875. (No specimens.)

*To all whom it may concern:*

Be it known that I, CHRISTIAN RUDOLPH, a subject of the Emperor of Germany, and resident at Offenbach-on-the-Main, Germany, have invented new and useful Improvements in Yellow Coloring-Matter, of which the following is a specification.

The new dye-stuff belongs to the same class of coloring-matters (benzoflavine) described in my United States Patent No. 250,851; but the starting material in this case is nitrotetraamidoditolylphenylmethan, which can be produced by two methods, viz: first, by combining nitrobenzaldehyde with toluylendiamine, or, secondly, by nitrifying tetraamidoditolylphenylmethan. The nitrotetraamidoditolylphenylmethan is transformed by three consecutive operations into pentaamidoditolylphenylmethan, into hydrotriamidodimethylphenylacridine, and finally into the amidobenzoflavine.

My way of producing is as follows:

I. *Reduction of the nitrotetraamidoditolylphenylmethan into pentaamidoditolylphenylmethan.*—26.5 pounds of the muriate of the nitrotetraamidoditolylphenylmethan are slowly mixed with a warm reducing solution of forty-five pounds of tin dichloride in one hundred and twenty pounds muriatic acid of 22.5° Baumé. As soon as the reaction is completed I dilute with much water and treat with sulphureted hydrogen to eliminate the tin, filter, and precipitate the pentaamidoditolylphenylmethan in the shape of white flakes by adding alkalies.

II. *Production of the hydrotriamidodimethylphenylacridine.*—Ten pounds of pentaamidoditolylphenylmethan and sixty pounds of muriatic acid of 16° Baumé are heated for several hours in an autoclave. After cooling, the hydrotriamidodimethylphenylacridine thus formed is found to be already nearly entirely separated. It is filtered off, washed with water, and dried. In this state it forms an orange-colored crystalline powder, the base of which is precipitated from an aqueous solution by alkalies in the shape of yellowish-white flakes.

III. *Production of the paraamidobenzoflavine.*—Thirty pounds of the hydro base are dissolved in thirty pounds of muriatic acid of 22.5° Baumé, diluted with much water containing some chloride of zinc. One hundred and fifty pounds of a twenty-per-cent. solution of sesquichloride of iron are allowed to run slowly into the above solution of the hydro base, and the dye-stuff precipitates at once. It is filtered off and washed with a diluted solution of common salt, pressed, and dried.

The amidobenzoflavine is a reddish-yellow powder not easily soluble in water, but very soluble in alcohol, which has an intensive yellow-greenish fluorescence. Alkalies precipitate the base of the dye-stuff from its watery solution as yellowish-white flakes. The dye-stuff dissolves in concentrated sulphuric acid with a light yellowish-green color, and the solution shows a pronounced fluorescence.

Cotton mordanted with tannic acid dyes with the amidobenzoflavine a very pure greenish yellow.

Having thus described my invention and the manner of employing the same, what I claim, and wish to have secured by Letters Patent of the United States of America, is—

The amidobenzoflavine dye-stuff herein described, which is produced from amidoditolylphenylmethan, and which is a reddish-yellow powder not easily soluble in water, but very soluble in alcohol, which has an intense yellow-greenish fluorescence, which will have its base precipitated by alkalies from its watery solution as yellowish-white flakes, and which dissolved in concentrated sulphuric acid makes a solution of a light yellowish-green color showing a pronounced fluorescence, substantially as herein set forth.

In testimony whereof I have signed my name to this specification in the presence of two subscribing witnesses.

CHRISTIAN RUDOLPH.

Witnesses:
JOSEPH PATRICK,
JEAN GRUND.